(12) United States Patent
Zhang et al.

(10) Patent No.: US 10,907,474 B2
(45) Date of Patent: Feb. 2, 2021

(54) REAMING AND SELF-ROTATING ANCHOR ROD AND USING METHOD THEREOF

(71) Applicant: China University of Mining and Technology, Xuzhou (CN)

(72) Inventors: Nong Zhang, Xuzhou (CN); Zhengzheng Xie, Xuzhou (CN); Changliang Han, Xuzhou (CN)

(73) Assignee: China University of Mining and Technology, Jiangsu (CN)

( * ) Notice: Subject to any disclaimer, the term of this patent is extended or adjusted under 35 U.S.C. 154(b) by 368 days.

(21) Appl. No.: 15/768,219

(22) PCT Filed: Jun. 7, 2017

(86) PCT No.: PCT/CN2017/087493
§ 371 (c)(1),
(2) Date: Apr. 13, 2018

(87) PCT Pub. No.: WO2018/095013
PCT Pub. Date: May 31, 2018

(65) Prior Publication Data
US 2020/0248552 A1 Aug. 6, 2020

(30) Foreign Application Priority Data
Nov. 25, 2016 (CN) .......................... 2016 1 1061660

(51) Int. Cl.
*E21D 20/00* (2006.01)
*E21D 21/00* (2006.01)
(Continued)

(52) U.S. Cl.
CPC .......... *E21F 17/185* (2013.01); *E21D 20/003* (2013.01); *E21D 20/02* (2013.01);
(Continued)

(58) Field of Classification Search
CPC ........................... E21D 20/003; E21D 21/004
See application file for complete search history.

(56) References Cited

U.S. PATENT DOCUMENTS

| 2009/0092458 A1* | 4/2009 | Moroney ............ F16B 25/0026 411/29 |
| 2011/0131787 A1 | 6/2011 | Moroney et al. |
| 2018/0003057 A1 | 1/2018 | McLaren |

FOREIGN PATENT DOCUMENTS

| AU | 2015201268 A1 | 4/2015 |
| CN | 101802420 A | 8/2010 |

(Continued)

OTHER PUBLICATIONS

International Search Report for PCT/CN2017/087493, dated Sep. 8, 2017, two (2) pages.

*Primary Examiner* — Sean D Andrish
(74) *Attorney, Agent, or Firm* — Greenberg Traurig, LLP

(57) ABSTRACT

A reaming and self-rotating anchor rod includes a rod body, a drill bit, a connecting member, a tray, and a nut. One end the connecting member is snap-fixed to the tail part of the rod body, the other end of the connecting member is connected to an anchor rod bolter. The rod body has an annular protrusion at its middle part to block powder so that the powder fills up the clearance between the rod body and the coal mass. The drill bit has female threads and can be screwed into the front part of the rod body, and the drill bit has baffle pawls and spiral grooves on its side surface.

2 Claims, 4 Drawing Sheets

(51) Int. Cl.
    *E21F 17/18*     (2006.01)
    *E21D 20/02*     (2006.01)
    *E21F 17/00*     (2006.01)
    *E21F 17/02*     (2006.01)
    *G01B 11/30*     (2006.01)

(52) U.S. Cl.
    CPC ............ *E21D 21/004* (2013.01); *E21F 17/00* (2013.01); *E21F 17/02* (2013.01); *G01B 11/303* (2013.01); *G01B 11/306* (2013.01)

(56) References Cited

FOREIGN PATENT DOCUMENTS

| | | |
|---|---|---|
| CN | 102704969 A | 10/2012 |
| CN | 105888709 A | 8/2016 |
| CN | 106368725 A | 2/2017 |
| WO | 2016123688 A1 | 8/2016 |

\* cited by examiner

REAMING AND SELF-ROTATING ANCHOR ROD AND USING METHOD THEREOF

CROSS REFERENCE TO RELATED APPLICATIONS

The present application is a 371 U.S. National Stage of International Application No. PCT/CN2017/087493, filed Jun. 7, 2017, entitled "REAMING AND SELF-ROTATING ANCHOR ROD AND USING METHOD THEREOF" which in turn claims priority to Chinese Application 201611061660.6 with the same title filed Nov. 25, 2016, both of which are incorporated herein by reference in their entirety.

TECHNICAL FIELD

The present invention relates to an anchor rod and a using method thereof, in particular to a reaming and self-rotating anchor rod used for downhole quick tunneling in coal mines and a using method thereof.

BACKGROUND OF RELATED ART

In China, the coal mining is mainly underground mining. Tunneling and stopping are important production links for underground coal mining. Therefore, coordination between tunneling and stopping is always an important issue in coal production in China. In recent years, especially since fully mechanized mining automation and information technology is developed, the advancing rate of coal mining working face has been increased continuously, but the tunneling rate hasn't kept up with the stopping speed. Consequently, the contradiction between tunneling and stopping becomes prominent, the working face replacement becomes tense, causing impact on the coal production. Wherein, coal roadways are locations where the tunneling workload is the highest in coal mines. With efficient and quick advancing of fully-mechanized mining working face, a large quantity of coal roadways is consumed every year. The coal roadway tunneling rate has direct influence on mining-excavation replacement. Therefore, improving the coal roadway tunneling rate is of crucial importance for safe and efficient coal production.

Existing tunneling surface equipment is very advanced, tunneling machines are widely applied and even continuous mining machines and driving and anchor machines are used in many modern coal mines. For modern coal mines, the coal cutting link during tunneling is no longer a major factor that restrains the advancing rate; rather, anchor rod supporting, especially wall supporting, severely restrains the advancing rate. Presently, a resin anchoring technique is mainly used for wall supporting, but this technique cannot meet the requirement for coal roadway quick tunneling anymore in some cases, owing to the following reasons: the working procedure is complex and time-consuming; the anchoring effect is poor, or even anchoring failure may occur, owing to broken or wet coal mass; the success ratio of long hole drilling in coal walls is very low, and collapse or blockage of the hole occurs often. Hence, it is necessary to develop an anchor rod and a working method, which can be quickly constructed, avoid the use of any anchoring agent, and improve anchoring force.

SUMMARY

To overcome the drawbacks in the prior art, the present invention provides a reaming and self-rotating anchor rod that can shorten supporting time and avoid an abandoned hole phenomenon incurred by hole collapse, anchor failure, or hole blockage, and is simple to manufacture, low in cost, and simple and convenient to operate; in addition, the present invention further provides a working method using the reaming and self-rotating anchor rod.

To attain the technical object described above, the reaming and self-rotating anchor rod provided in the present invention comprises a rod body, a drill bit, a connecting member, and a tightening device, wherein, the rod body has threads without longitudinal rib on the external surface, the drill bit is arranged at the head part of the rod body, the head part of the rod body is connected with the drill bit via threads, the pitch of the drill bit is identical to that of the threads without longitudinal rib, the rod body has an anchoring device and a connecting part in a symmetric wedge on the front and rear of the tail part respectively, the connecting part has a connecting member thereon to facilitate the connection to an anchor rod bolter, an end of the connecting member connected to the rod body is a cylinder with an inverted wedge-shaped cut therein, which matches the symmetric wedge at the tail part of the anchor rod body; wherein, the rod body, the drill bit and the connecting member are interconnected through a threaded connection into a combined structure; the tightening device comprises a tray and a nut; when the rod body penetrates into a coal seam, the tray is fitted over the tail part of the rod body and is fixed by the nut.

The out diameter of the drill bit is greater than the diameter of the anchor rod body by 3~8 mm, the drill bit has an opening connected with the anchor rod body, a plurality of sharp knives that protrude and incline toward the center of the drill bit are arranged around the opening, the top of each sharp knife is at 3 mm~5 mm from the center of the drill bit, spiral grooves configured to discharge the slack coal produced during drilling from the drill bit are arranged on the side surface of the drill bit, and the spiral grooves are in 5 mm~8 mm width and 3 mm~5 mm depth.

A plurality of baffle pawls are arranged at the clearance between the grooves on the side surface of the drill bit, and the baffle pawl comprises a groove cavity, a circular shaft, a high-strength baffle plate and a strong spring, wherein, the groove cavity provides a space for rotation of the high-strength baffle plate, one side of the bottom of the groove cavity is movably connected with the high-strength baffle plate via the circular shaft, the strong spring is arranged between the high-strength baffle plate and the bottom of the groove cavity, the high-strength baffle plate is ejected by the strong spring and can rotate within the groove cavity via the circular shaft.

The symmetric wedge at the tail part of the rod body is in length of 30 mm~100 mm, and the opening angle of the wedge is 55~75°.

There is an annular protrusion welded to the rod body at ⅓~⅔ length of the rod body, the diameter of the annular protrusion is greater than that of the rod body by 3 mm~8 mm, and the thickness of the annular protrusion is 2~3 mm.

A method of using the reaming and self-rotating anchor rod described above comprises the following steps:

a. mounting the drill bit on an ordinary drill rod and mounting the ordinary drill rod on an anchor rod bolter after a roadway is excavated by a tunneling machine, wherein, the diameters of the ordinary drill rod and the drill bit are the same, and both are smaller than the diameter of the rod body of the reaming and self-rotating anchor rod by 2~4 mm; arranging a drilling point for a hole in a coal seam, starting the anchor rod bolter to drill at the drilling point, till the length of the ordinary drill rod penetrating into the coal seam is ⅓~⅔ of the length of the reaming and self-rotating anchor rod, and then stopping the drilling and withdrawing the ordinary drill rod and the drill bit;

b. screwing the drill bit into the front part of the rod body of the reaming and self-rotating anchor rod by means of the threads, placing the drill bit into the hole, keeping the baffle pawls of the drill bit in a closed state and keeping the connecting member for connecting the anchor rod bolter with the rod body in a level state so that the wedge at the tail part of the rod body is right embedded in the connecting member, and then mounting the reaming and self-rotating anchor rod to the anchor rod bolter via the connecting member;

c. starting the anchor rod bolter, driving the reaming and self-rotating anchor rod to advance quickly in the existing small hole to accomplish reaming under the action of the rotation of the drill bit on the front part of the reaming and self-rotating anchor rod and the pushing force applied by a worker, so that friction force is generated between the anchor rod body and the coal seam; decreasing the drilling rate of the anchor rod bolter when the reaming and self-rotating anchor rod has reached to the bottom of the pre-formed small hole in the coal seam judged from obvious advancing resistance, utilizing the drill bit on the front part of the anchor rod to rotate the rod body into the coal mass, wherein, since the shape knives on the front part of the drill bit are in middle positions, the powder produced during drilling can be discharged away from the head part of the rod body through the spiral grooves on the side surface of the drill bit, the annular protrusion on the rod body blocks the powder flowing out from the hole and thereby the powder fills the clearance between the rod body and the coal mass; shutting down the anchor rod bolter when the exposed length of the anchor rod body is 30~150 mm, and separating the connecting member from the symmetric wedge at the tail part of the rod body, wherein, since the self-rotation of the anchor rod, there is a force interaction between the connecting member and the rod body, the rod body ought to retreat by some distance together with the connecting member when the connecting member is separated from the rod body, but the strong springs of the baffle pawls on the drill bit eject at this point and the high-strength baffle plates are pushed open and extend out of the groove cavities to block the rod body from further retreating; then, fitting the tray over the tail part of the rod body and mounting the nut on the tail part of the rod body to fix the tray, and using the anchor rod bolter to rotate the nut to accomplish primary pre-tightening of the anchor rod, so that the anchor rod is squeezed and embedded into the coal mass, and thereby the friction force between the anchor rod and the coal mass is increased, the anchor rod is anchored in the full length, and the installation of a complete set of anchor rod is accomplished;

d. at 1 h~2 h after the anchor rod works, tightening up the nut with a wrench for secondary pre-tightening, to prevent prestress relaxation of the anchor rod incurred by working of other anchor rods nearby;

e. at 12 h~24 h after the anchor rod works, checking the pre-tightening force on the anchor rod with a torque-indicating wrench, and pre-tightening up the anchor rod again if the pre-tightening force doesn't meet the requirement, so that the tray squeezes the cracked coal wall to maintain the pre-tightening force;

f. repeating the steps a~e for working of the next reaming and self-rotating anchor rod.

Benefits: with the above-mentioned technical scheme, the present invention has the following advantages when compared with the prior art:

(1) The coal wall supporting process is simplified, and the supporting time required for anchor rod installation is reduced. The anchor rod can penetrate into the coal mass successfully under the action of the rotation of the drill bit on the front part of the reaming and self-rotating anchor rod and the pushing force applied by the worker, and then the anchor rod is pre-tightened up and the working of the anchor rod is accomplished; such a process does not require drilling a long hole with a drilling machine, avoids using any anchoring agent, and shortens the construction time. The anchor rod is difficult to work owing to the limitation of the cross section of the roadway; a small hole is drilled out with a drilling machine in advance, the reaming and self-rotating anchor rod is placed into the small hole and driven to rotate into the coal mass, so that anchoring force for the anchor rod is formed by means of friction force and embedding force generated from squeezing between the anchor rod body and the coal mass, to maintain the stability of the surrounding rocks of the roadway and avoid the problem of hole collapse and blockage incurred by drilling a long hole; thus, the supporting time is greatly reduced, and the requirement for quick tunneling of coal roadways is met. (2) The anchor rod is simple to manufacture, low in cost, simple and convenient to operate, and can be widely applied and has high applicability.

In the figures: 1—rod body; 1-1—symmetric wedge; 1-2—annular protrusion; 2—drill bit; 3—connecting member; 4—tray; 5—nut; 6—anchor rod bolter; 7—coal seam; 8—small hole; 9—spiral groove; 10—shape knife; 11—baffle pawl; 11-1—groove cavity; 11-2—circular shaft; 11-3—high-strength baffle plate; 11-4—strong spring; 12 tail—part.

DETAILED DESCRIPTION

Hereunder, an embodiment of the present invention will be further detailed with reference to the accompanying drawings.

Figure 1:
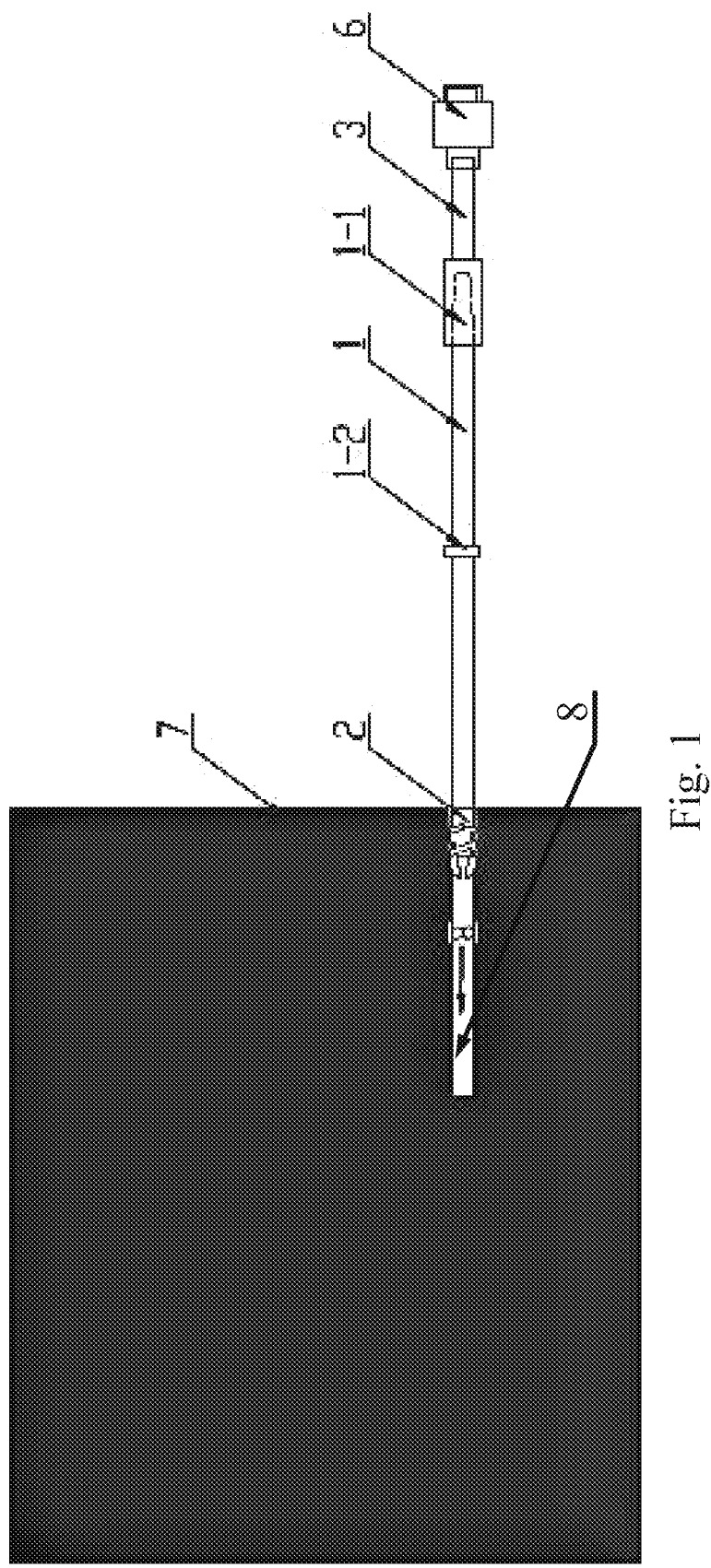
FIG. 1 is a schematic diagram of the reaming and self-rotating anchor rod during the working process.
Figure 2:
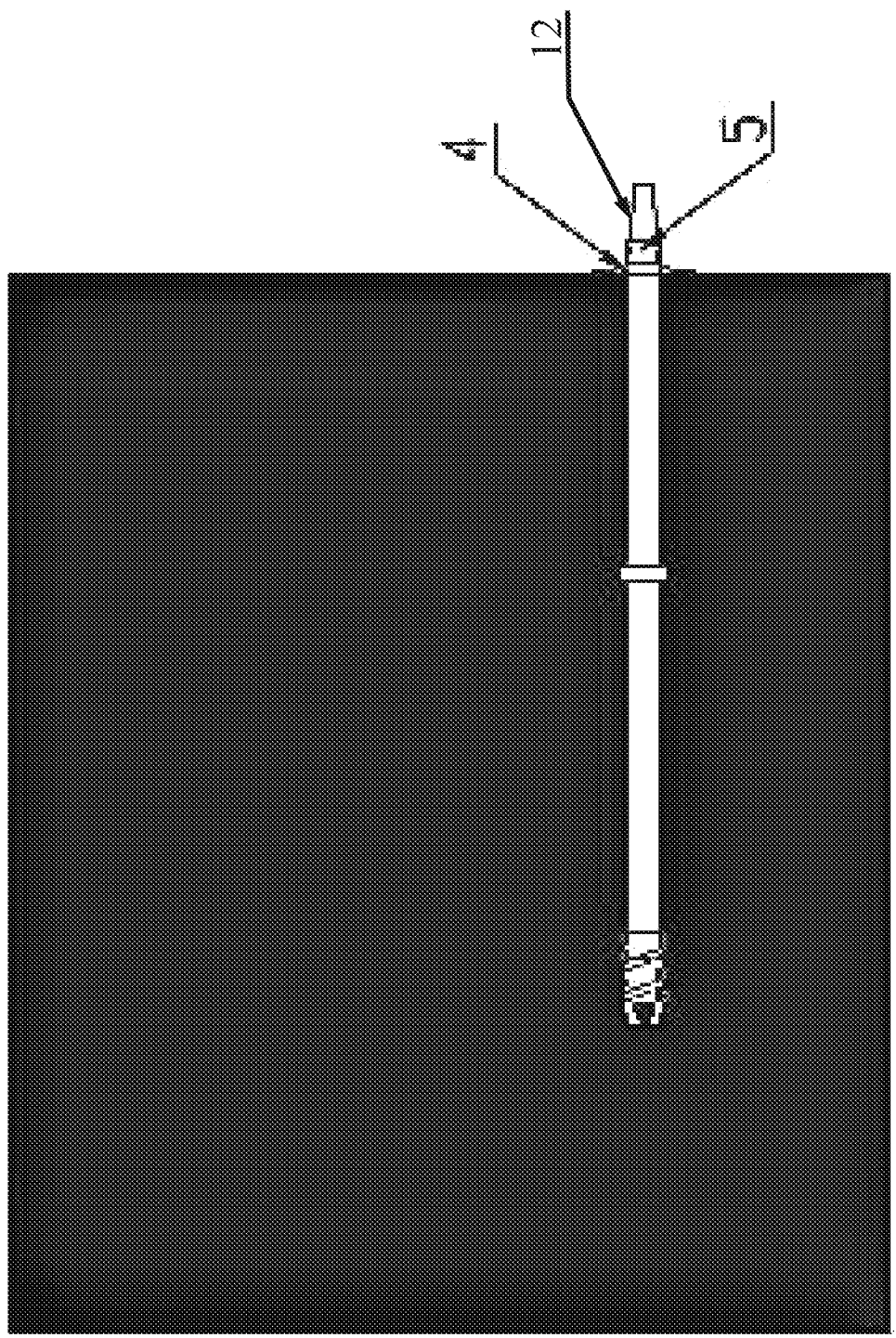
FIG. 2 is a schematic diagram the reaming and self-rotating anchor rod after the working process.

As shown in FIGS. 1 and 2, the reaming and self-rotating anchor rod provided in the present invention comprises a rod body 1, a drill bit 2, a connecting member 3, and a tightening device, wherein the rod body 1 has threads without longitudinal rib on the external surface, the drill bit 2 is arranged at the head part of the rod body 1, the head part of the rod body 1 is connected with the drill bit 2 via threads, and the pitch of the drill bit 2 is identical to that of threads without longitudinal rib.

Figure 3:
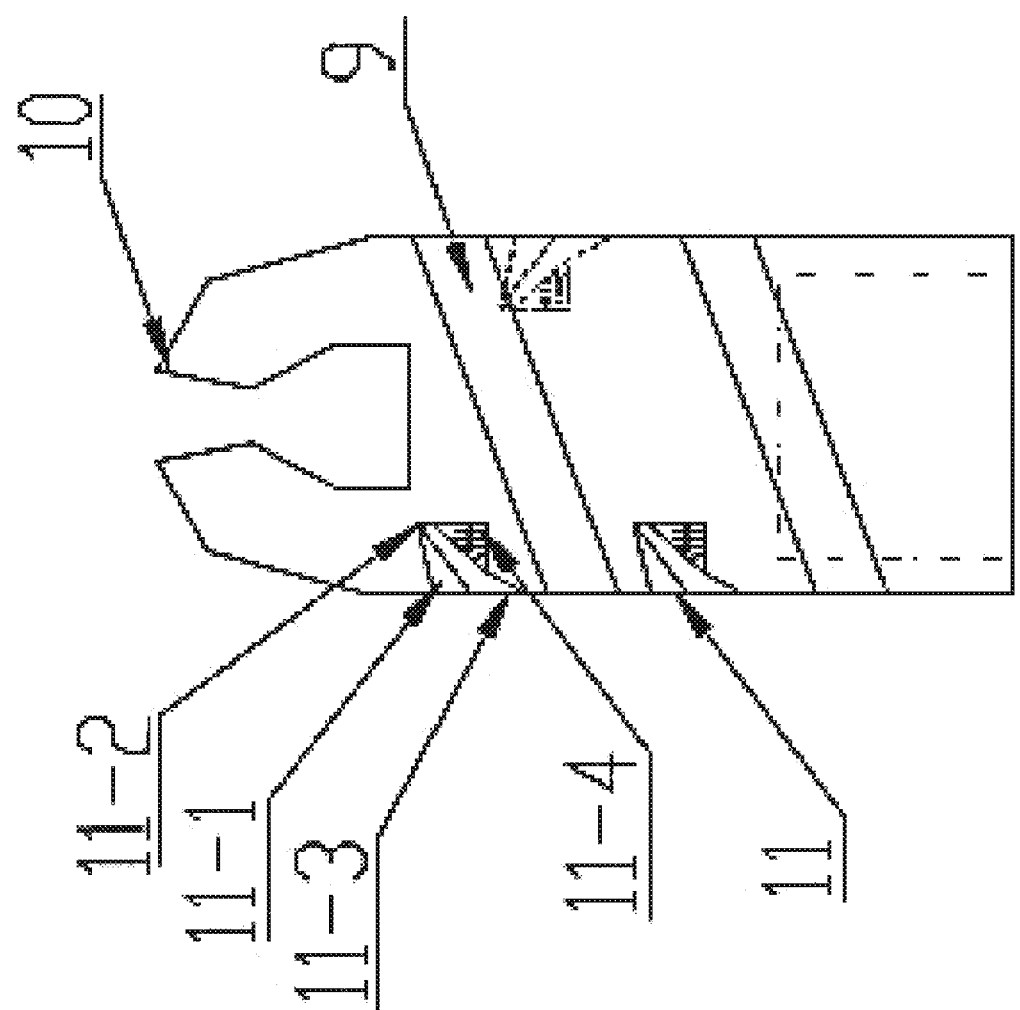
FIG. 3 is an overall schematic diagram of the drill bit of the reaming and self-rotating anchor rod.

As shown in FIG. 3, the out diameter of the drill bit 2 is greater than the diameter of the anchor rod body 1 by 3~8 mm, the drill bit 2 has an opening connected with the anchor rod body 1, a plurality of sharp knives 10 that protrude and incline toward the center of the drill bit 2 are arranged around the opening, the top of each sharp knife 10 is at 3 mm~5 mm distance from the center of the drill bit 2, spiral grooves 9 configured to discharge the slack coal produced during drilling from the drill bit 2 are arranged on the side surface of the drill bit 2, and the spiral grooves 9 are in 5 mm~8 mm width and 3 mm~5 mm depth. A plurality of baffle pawls 11 are arranged at the clearance between the grooves 9 on the side surface of the drill bit 2, and the baffle pawl 11 comprises a groove cavity 11-1, a circular shaft 11-2, a high-strength baffle plate 11-3 and a strong spring 11-4, wherein, the groove cavity 11-1 provides a space for rotation of the high-strength baffle plate 11-3, one side of the bottom of the groove cavity 11-1 is movably connected with the high-strength baffle plate 11-3 via the circular shaft 11-2, the strong spring 11-4 is arranged between the high-strength baffle plate 11-3 and the bottom of the groove cavity 11-1, the high-strength baffle plate 11-3 is ejected by the strong spring 11-4 and can rotate within the groove cavity 11-1 via the circular shaft 11-2.

Figure 4:
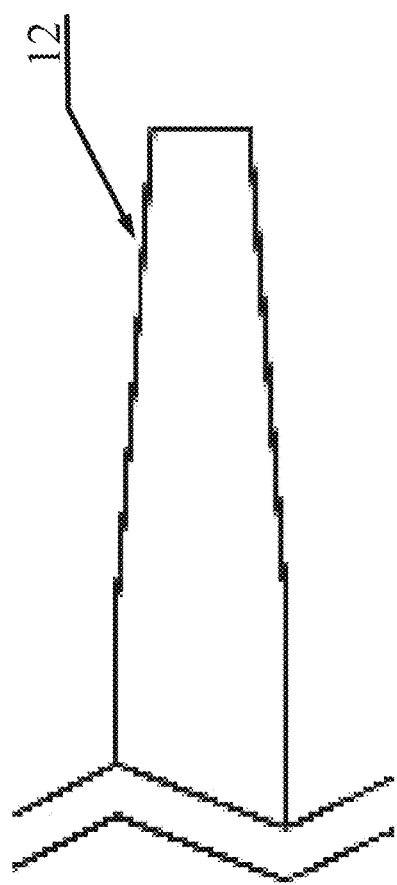
FIG. 4 is a front view of the tail part of rod body of the reaming and self-rotating anchor rod.
Figure 5:
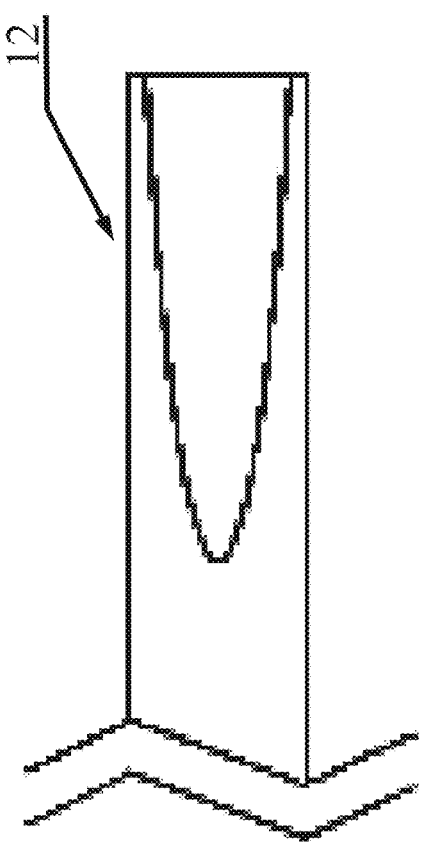
FIG. 5 is a top view of the tail part of rod body of the reaming and self-rotating anchor rod.

As shown in FIGS. 4 and 5, the rod body 1 has an anchoring device and a connecting part in a symmetric wedge on the front and rear of the tail part 12 respectively, the symmetric wedge 1-1 at the tail part 12 of the rod body 1 is in length of 30 mm~100 mm, the opening angle of the wedge is 55~75°, there is an annular protrusion 1-2 welded to the rod body 1 at ⅓~⅔ of the length of the rod body 1, the diameter of the annular protrusion 1-2 is greater than that of the rod body 1 by 3 mm~8 mm, the thickness of the annular protrusion 1-2 is 2~3 mm, the connecting part has a connecting member 3 to facilitate the connection to the anchor rod bolter 6, an end of the connecting member 3 connected to the rod body 1 is a cylinder with an inverted wedge-shaped cut therein, which matches the symmetric wedge 1-1 at the tail part 12 of the anchor rod body, wherein, the rod body 1, the drill bit 2 and the connecting member 3 are interconnected through a threaded connection into a combined structure; the tightening device comprises a tray 4 and a nut 5; when the rod body 1 penetrates into a coal seam 7, the tray 4 is fitted over the tail part 12 of the rod body 1 and is fixed by the nut 5.

A method of using the reaming and self-rotating anchor rod described above comprises the following steps:

a. mounting the drill bit on an ordinary drill rod and mounting the ordinary drill rod on an anchor rod bolter 6 after a roadway is excavated by a tunneling machine, wherein, the diameters of the ordinary drill rod and the drill bit are the same and both are smaller than the diameter of the rod body 1 of the reaming and self-rotating anchor rod by 2 mm~4 mm; arranging a drilling point for a hole 8 in a coal seam 7, starting the anchor rod bolter 6 to drill at the drilling point, till the length of the ordinary drill rod penetrating into the coal seam 7 is ⅓~⅔ of the length of the reaming and self-rotating anchor rod, and then stopping the drilling and withdrawing the ordinary drill rod and the drill bit;

b. screwing the drill bit 2 into the front part of the rod body 1 of the reaming and self-rotating anchor rod by means of the threads, placing the drill bit 2 into the hole, keeping the baffle pawls 11 of the drill bit in a closed state and keeping the connecting member 3 for connecting the anchor rod bolter with the rod body 1 in a level state so that the wedge at the tail part 12 of the rod body 1 is right embedded in the connecting member 3, and then mounting the reaming and self-rotating anchor rod to the anchor rod bolter 6 via the connecting member 3;

c. starting the anchor rod bolter, driving the reaming and self-rotating anchor rod to advance quickly in the existing small hole 8 to accomplish reaming under the action of the rotation of the drill bit 2 on the front part of the reaming and self-rotating anchor rod and the pushing force applied by a worker, so that friction force is generated between the anchor rod body 1 and the coal seam 7; decreasing the drilling rate of the anchor rod bolter 6 when the reaming and self-rotating anchor rod has reached to the bottom of the preformed small hole 8 in the coal seam 7 judged from obvious advancing resistance, utilizing the drill bit 2 on the front part of the anchor rod to rotate the rod body 1 into the coal mass, wherein, since the shape knives 10 on the front part of the drill bit 2 are in middle positions, the powder produced during drilling can be discharged away from the head part of the rod body 1 through the spiral grooves 9 on the side surface of the drill bit 2, the annular protrusion 1-2 on the rod body 1 blocks powder flowing out from the hole and thereby the powder fills the clearance between the rod body 1 and the coal mass; shutting down the anchor rod bolter 6 when the exposed length of the anchor rod body 1 is 30 mm~150 mm, and separating the connecting member 3 from the symmetric wedge 1-1 at the tail part 12 of the rod body 1, wherein, since the self-rotation of the anchor rod, there is a force interaction between the connecting member 3 and the rod body 1, the rod body 1 ought to retreat by some distance together with the connecting member 3 when the connecting member 3 is separated from the rod body 1, but the strong springs 11-4 of the baffle pawls 11 on the drill bit 2 eject at this point and the high-strength baffle plates 11-3 are pushed open and extend out of the groove cavities 11-1 to block the rod body 1 from further retreating; then, fitting the tray 4 over the tail part 12 of the rod body 1 and mounting the nut 5 on the tail part 12 of the rod body 1 to fix the tray 4, and using the anchor rod bolter 6 to rotate the nut to accomplish primary pre-tightening of the anchor rod, so that the anchor rod is squeezed and embedded into the coal mass, and thereby the friction force between the anchor rod and the coal mass is increased, the anchor rod is anchored in the full length, and the installation of a complete set of anchor rod is accomplished;

d. at 1 h~2 h after the anchor rod works, tightening up the nut 5 with a wrench for secondary pre-tightening, to prevent prestress relaxation of the anchor rod incurred by working of other anchor rods nearby;

e. at 12~24 h after the anchor rod works, checking the pre-tightening force on the anchor rod with a torque-indicating wrench, and pre-tightening up the anchor rod again if the pre-tightening force doesn't meet the requirement, so that the tray 4 squeezes the cracked coal wall to maintain the pre-tightening force;

f. repeating the steps a~e for working of the next reaming and self-rotating anchor rod.

We claim:

1. A reaming and self-rotating anchor rod, comprising:
a rod body, wherein the rod body has threads without longitudinal rib on an external surface and the rod body including an anchoring device and a connecting part in a symmetric wedge on a front and rear of a tail part respectively;
a drill bit, wherein the drill bit is arranged at a head part of the rod body;
the head part of the rod body connected with the drill bit via a plurality of threads, wherein a pitch of the drill bit is identical to a pitch of the threads without longitudinal rib;
a connecting member on the connecting part to facilitate a connection to an anchor rod bolter, an end of the connecting member connected to the rod body is a cylinder with an inverted wedge-shaped cut therein, which matches the symmetric wedge at the tail part of the anchor rod body; wherein, the rod body, the drill bit and the connecting member are interconnected through a threaded connection into a combined structure, and a tray and a nut;

wherein when the rod body penetrates into a coal seam, the tray is fitted over the tail part of the rod body and is fixed by the nut;

wherein an out diameter of the drill bit is greater than a diameter of the anchor rod body by 3~8 mm, wherein the drill bit has an opening connected with the anchor rod body and a plurality of sharp knives that protrude and incline toward a center of the drill bit are arranged around the opening, a top of each sharp knife being between 3 mm and 5 mm from the center of the drill bit including spiral grooves configured to discharge slack coal produced during drilling from the drill bit are arranged on a side surface of the drill bit, wherein the spiral grooves are in 5 mm~8 mm width and 3 mm~5=depth;

wherein a plurality of baffle pawls are arranged at a clearance between the grooves on the side surface of the drill bit, and each baffle pawl comprises:
a high-strength baffle plate,
a groove cavity, the groove cavity provides a space for rotation of the high-strength baffle plate,
a circular shaft, one side of a bottom of the groove cavity is movably connected with the high-strength baffle plate via the circular shaft, and
a strong spring, the strong spring being arranged between the high-strength baffle plate and the bottom of the groove cavity, the high-strength baffle plate is ejected by the strong spring and can rotate within the groove cavity via the circular shaft;

wherein the symmetric wedge at the tail part of the rod body has a length between 30 mm and 100 mm, and an opening angle of the symmetric wedge is between 55° and 75°;

wherein the rod body has an annular protrusion welded to the rod body between ⅓ and ⅔ length of the rod body, a diameter of the annular protrusion is greater than a diameter of the rod body by 3 mm~8 mm, and a thickness of the annular protrusion is between 2 mm and 3 mm.

2. A method of using the reaming and self-rotating anchor rod according to claim 1 comprising:
mounting the drill bit on an ordinary drill rod and mounting the ordinary drill rod on an anchor rod bolter after a roadway is excavated by a tunneling machine, diameters of the ordinary drill rod and the drill bit are the same and both diameters are smaller than a diameter of the rod body of the reaming and self-rotating anchor rod by 2 mm~4 mm; arranging a drilling point for a hole in a coal seam, starting the anchor rod bolter to drill at the drilling point, until a length of the ordinary drill rod penetrating into the coal seam is ⅓~⅔ of a length of the reaming and self-rotating anchor rod, and then stopping the drilling and withdrawing the ordinary drill rod and the drill bit;
screwing the drill bit into a front part of the rod body of the reaming and self-rotating anchor rod by means of the threads, placing the drill bit into the hole, keeping the plurality of baffle pawls of the drill bit in a closed state and keeping the connecting member for connecting the anchor rod bolter with the rod body in a level state so that the symmetric wedge at the tail part of the rod body is embedded in the connecting member, and then mounting the reaming and self-rotating anchor rod to the anchor rod bolter via the connecting member;
starting the anchor rod bolter, driving the reaming and self-rotating anchor rod to advance quickly in the existing small hole to accomplish reaming under action of the rotation of the drill bit on a front part of the reaming and self-rotating anchor rod and a pushing force applied by a worker, so that friction force is generated between the anchor rod body and the coal seam; decreasing a drilling rate of the anchor rod bolter upon the reaming and self-rotating anchor rod reaching a bottom of the preformed small hole in the coal seam judged from obvious advancing resistance, utilizing the drill bit on the front part of the anchor rod to rotate the rod body into a coal mass, since shape knives on a front part of the drill bit are in middle positions, powder produced during drilling is discharged away from a head part of the rod body through the spiral grooves on the side surface of the drill bit, the annular protrusion on the rod body blocks the powder flowing out from the hole and thereby the powder fills a clearance between the rod body and the coal mass; shutting down the anchor rod bolter upon an exposed length of the anchor rod body reaching 30 mm~150 mm, and separating the connecting member from the symmetric wedge at the tail part of the rod body, since the self-rotation of the anchor rod, there is a force interaction between the connecting member and the rod body, the rod body retreats by a distance together with the connecting member as the connecting member separates from the rod body, but the strong springs of the baffle pawls on the drill bit eject and the high-strength baffle plates are pushed open and extend out of the groove cavities to block the rod body from further retreating; then, fitting the tray over the tail part of the rod body and mounting the nut on the tail part of the rod body to fix the tray, and using the anchor rod bolter to rotate the nut to accomplish primary pre-tightening of the anchor rod, so that the anchor rod is squeezed and embedded into the coal mass, and thereby the friction force between the anchor rod and the coal mass is increased, the anchor rod is anchored in a full length, and the installation of a complete set of anchor rod is accomplished;
at 1 h~2 h after the anchor rod works, tightening up the nut with a wrench for secondary pre-tightening, to prevent prestress relaxation of the anchor rod incurred by working of other anchor rods nearby;
at 12~24 h after the anchor rod works, checking the pre-tightening force on the anchor rod with a torque-indicating wrench to determine that the pre-tightening force does not meet a requirement, and pre-tightening up the anchor rod again to meet the requirement so that the tray squeezes the cracked coal wall to maintain the pre-tightening force; and
repeating the steps to work the next reaming and self-rotating anchor rod.

* * * * *